(12) United States Patent
Mueller et al.

(10) Patent No.: US 12,036,642 B2
(45) Date of Patent: Jul. 16, 2024

(54) SYSTEMS AND METHODS FOR REMOVING A PANEL INSERT

(71) Applicant: THE BOEING COMPANY, Chicago, IL (US)

(72) Inventors: Andrew William Mueller, Mukilteo, WA (US); Terrence C. Seet, Everett, WA (US); John C. Osborne, Madison, AL (US)

(73) Assignee: The Boeing Company, Chicago, IL (US)

( * ) Notice: Subject to any disclaimer, the term of this patent is extended or adjusted under 35 U.S.C. 154(b) by 175 days.

(21) Appl. No.: 17/900,959

(22) Filed: Sep. 1, 2022

(65) Prior Publication Data
US 2024/0075563 A1  Mar. 7, 2024

(51) Int. Cl.
*B25B 27/02* (2006.01)
*B23P 19/02* (2006.01)
*B23P 19/04* (2006.01)

(52) U.S. Cl.
CPC ............ *B25B 27/02* (2013.01); *B23P 19/025* (2013.01); *B23P 19/04* (2013.01)

(58) Field of Classification Search
CPC . B25B 27/02–023; B25B 27/14; B25B 27/28; Y10T 29/49822; Y10T 29/53796; Y10T 29/53848; Y10T 29/53909; B23P 19/02; B23P 19/025; B23P 19/04
See application file for complete search history.

(56) References Cited

U.S. PATENT DOCUMENTS

| | | | |
|---|---|---|---|
| 3,873,029 A | 3/1975 | Amerace | |
| 4,093,491 A | 6/1978 | Whelpton | |
| 4,355,222 A | 10/1982 | Geithman et al. | |
| 4,885,667 A | 12/1989 | Selden | |
| 6,449,823 B2 * | 9/2002 | Krapp | B25B 13/48 29/244 |
| 8,595,911 B2 | 12/2013 | Hendren | |
| 8,741,081 B2 | 6/2014 | Schmitt | |
| 9,782,877 B2 | 10/2017 | Marquis | |
| 11,167,401 B2 | 11/2021 | Osborne | |
| 11,229,089 B2 | 1/2022 | Systems | |
| 2011/0290774 A1 | 12/2011 | Denante | |
| 2018/0147788 A1 | 5/2018 | Newfrey | |

FOREIGN PATENT DOCUMENTS

| | | |
|---|---|---|
| CN | 105786086 | 7/2016 |
| CN | 205485711 | 8/2016 |

* cited by examiner

*Primary Examiner* — Matthew P Travers
(74) *Attorney, Agent, or Firm* — Joseph M. Butscher; The Small Patent Law Group LLC

(57) ABSTRACT

A system for removing a panel insert from a panel includes a main housing. A loading cap is coupled to the main housing. A tension knob is coupled to the main housing. The tension knob is configured to couple to a puller rod. A tension spring is within the main housing. The loading cap is configured to set the tension spring at an initial tension. The tension knob is configured to set the tension spring at a subsequent tension. A heater is configured to apply heat to the panel insert.

21 Claims, 10 Drawing Sheets

SYSTEMS AND METHODS FOR REMOVING A PANEL INSERT

FIELD OF THE DISCLOSURE

Examples of the present disclosure generally relate to tools, and more particularly to systems and methods for removing panel inserts from panels.

BACKGROUND OF THE DISCLOSURE

Panels are used in a variety of applications as structural elements. When fastening a panel to another element, holes may be drilled or otherwise formed through the panel for a fastener or the like. Depending on the type of material used for the panel, it may be undesirable to install the fastener directly in the holes of the panel. Thus, panel inserts may be installed in the holes of the panel. One type of panel insert is a one-sided panel insert that includes a bushing that is inserted in a hole of the panel, and a flange on one end of the bushing that engages one side of the panel. The other end of the bushing may be flush with the other side of the panel, may be recessed in the hole, may project from the hole, and/or the like. A one-sided panel insert also includes a thru-hole (threaded or non-threaded) for a fastener that is used to secure the panel to another element. A one-sided panel insert is typically bonded to the panel with an adhesive on the flange and/or bushing.

After installation, there may be a need to remove a panel insert from the panel, such as when the panel insert becomes corroded, damaged, or the like. However, it may be challenging to remove the panel insert without causing damage to the panel.

SUMMARY OF THE DISCLOSURE

A need exists for an efficient and effective system and method for removing an insert from a panel.

With that need in mind, certain examples of the present disclosure provide a system for removing a panel insert from a panel. The system includes a main housing. A loading cap is coupled to the main housing. A tension knob is coupled to the main housing. The tension knob is configured to couple to a puller rod. A tension spring is within the main housing. The loading cap is configured to set the tension spring at an initial (or first) tension. The tension knob is configured to set the tension spring at a subsequent (or second) tension. A heater is configured to apply heat to the panel insert.

In at least one example, the tension knob includes an engagement head, and a stem extending from the engagement head. The stem extends into a central channel formed through the loading cap.

In at least one example, the tension knob couples to an upper end of the puller rod within the main housing.

In at least one example, the main housing includes a neck. The loading cap rotationally couples to the neck. As a further example, the neck includes one or more guide channels, and the loading cap includes one or more bearings. The one or more guide channels retain the one or more bearings. As a further example, the one or more guide channels include an upper segment. An arcuate segment is connected to the upper segment. The arcuate segment downwardly curves around a portion of the neck. A notch is also connected to the arcuate segment.

In at least one example, the neck includes a circumferential flange configured to prevent the loading cap from disconnecting from the neck.

In at least one example, the tension spring is fully contained within the main housing.

In at least one example, the heater is contained within the main housing. In a further example, the heater is moveable within the main housing.

In at least one example, a portion of a shaft of the puller rod passes through the heater. In a further example, the heater includes one or more heat isolating components between the heater and the portion of the shaft of the puller rod.

In at least one example, the loading cap includes one or more tool-engagement channels configured to receive one or more portions of a hand tool.

In at least one example, one or more tension keys are configured to be disposed between the tension knob and the loading cap to set the tension spring at the subsequent tension. In at least one further example, the one or more tension keys are removably retained with one or more key channels of the main housing. In at least one further example, the one or more tension keys include a plurality of tension keys, and each of the plurality of tension keys has a different height.

Certain examples of the present disclosure provide a method for removing a panel insert from a panel. The method includes setting, by a loading cap coupled to a main housing, an initial tension of a tension spring disposed within the main housing; setting, by a tension knob coupled to the main housing and an upper end of a puller rod within the main housing, a subsequent tension of the tension spring; and applying, by a heater, heat to the panel insert.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for efficiently and effectively removing a panel insert from a panel. In at least one example, the systems and methods include a repair tool that is configured to remove an individual insert from panel (such as a floor panel) without damaging composite layers of the panel or deforming a hole in which the insert is placed. In at least one example, the tool is configured to apply a specific and consistent pulling force and heat to the insert. The applied heat releases the bond between an adhesive and the insert, thereby allowing the insert to be easily removed from the panel. For example, when the coupling bond of the adhesive is removed, tension applied to the insert by the tool removes the insert from the panel.

Certain examples of the present disclosure provide a tool for automatically removing an insert from a composite floor panel. The tool is configured to exert a uniform pulling force on the insert, heat the insert and adhesive, and then automatically remove the insert from the panel during the heating. In at least one example, the tool is configured to remove various types of inserts, such as through adjustable spring rate control.

Figure 1:
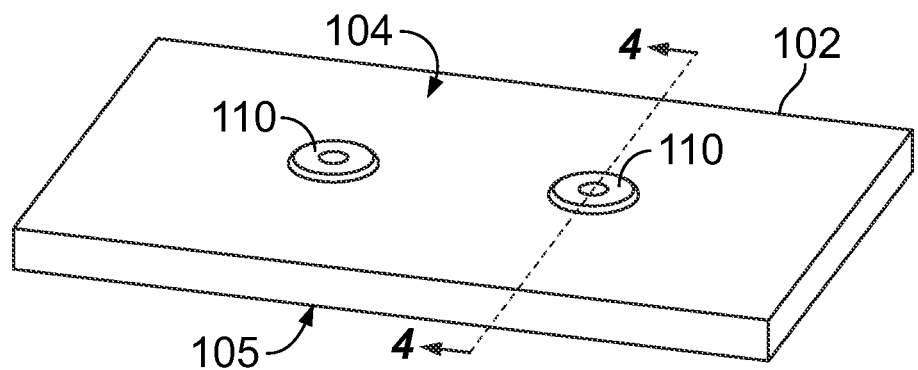
FIG. 1 illustrates an isometric top view of a panel.

FIG. 1 illustrates an isometric top view of a panel 102. The panel 102 is generally flat or planar, and may be made from metal materials, such as Titanium, Aluminum, etc., may be made from composite materials, such as a Carbon Fiber Reinforced Polymer (CFRP), Carbon Fiber Reinforced Plastic (CRP), Carbon Fiber Reinforced Thermoplastic (CFRTP), etc., or may be made from another type of material, such as fiberglass. The panel 102 may be used as a structural element for machines, such as aircraft, watercraft, automobiles, and the like.

Figure 2:
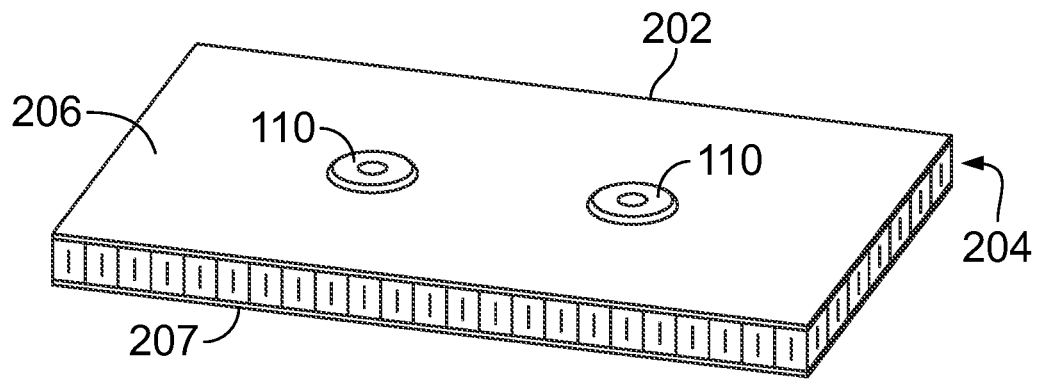
FIG. 2 illustrates an isometric top view of a honeycomb panel.

FIG. 2 illustrates an isometric top view of a honeycomb panel 202. The honeycomb panel 202 is an example of the panel 102, shown in FIG. 1. The honeycomb panel 202 includes a honeycomb core 204 sandwiched between face sheets 206 and 207. The honeycomb core 204 is a cellular structure including an array of empty or hollow cells (for example, hexagonal cells). The face sheets 206 and 207 are bonded to opposing sides of the honeycomb core 204. The face sheets 206 and 207 may be solid sheets of material or perforated sheets of material that are generally flat.

Referring again to FIG. 1, when the panel 102 is fastened to another element, holes may be drilled or otherwise formed through the panel 102 for a fastener or the like. To protect the panel 102, a panel insert 110 can be installed in the holes of the panel 102. The panel inserts 110 as described herein may be one-sided, as the panel inserts 110 are inserted into holes in the panel 102 from one side (for example, the top side 104) of the panel 102. The panel inserts 110 are typically bonded to the panel 102 to secure the panel inserts 110 in the holes.

Figure 3:
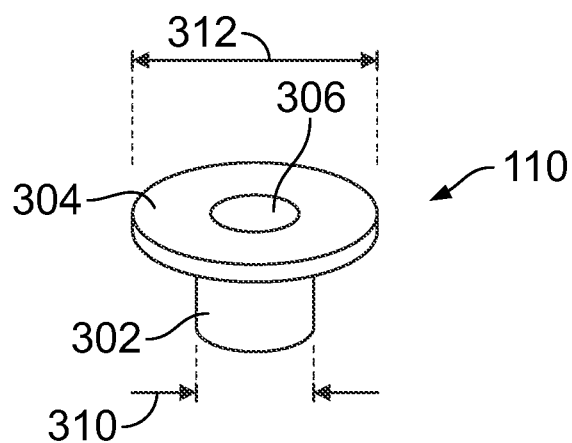
FIG. 3 illustrates an isometric top view of a panel insert.

FIG. 3 illustrates an isometric top view of the panel insert 110. The panel insert 110 includes a bushing 302 or shaft that is inserted in a hole of the panel 102, and a flange 304 on one end of the bushing 302. An outer diameter 310 of the bushing 302 is sized to fit within a hole in the panel 102. The outer surface of the bushing 302 may have surface features, such as ribs, splines, etc., or may be smooth. The flange 304 has an outer diameter 312 that is larger than the outer diameter 310 of the bushing 302 so that the flange 304 contacts the top side 104 of the panel 102 when the panel insert 110 is pressed or otherwise inserted in the panel 102. The panel insert 110 also includes a thru-hole 306 (threaded or non-threaded) for a fastener that is used to secure the panel 102 to another element. Figure shows the structure of a general panel insert 110. The panel insert 110 can be sized, shaped, and configured differently than shown.

Figure 4:
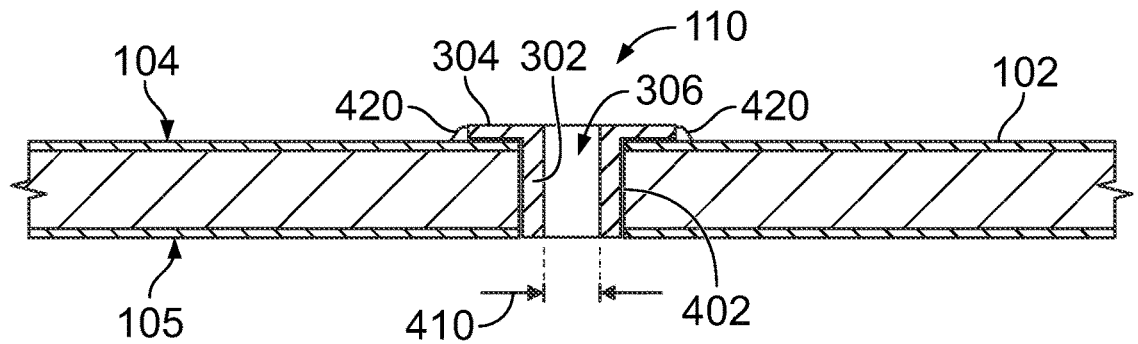
FIG. 4 illustrates a cross-sectional view of a panel insert installed in a panel through line 4-4 of FIG. 1.

FIG. 4 illustrates a cross-sectional view of the panel insert 110 installed in the panel 102 through line 4-4 of FIG. 1. The panel insert 110 is pressed or otherwise installed in a hole 402 of the panel 102 from the top side 104. When installed, the bushing 302 of the panel insert 110 fits within the hole 402, and the flange 304 contacts the top side 104 of the panel 102. The end of the bushing 302 opposite the flange 304 may be flush with a bottom side 105 of the panel 102 as is illustrated in FIG. 4. However, this end of the bushing 302 may be partially recessed into the hole 402 or may project from the hole 402 in other examples. The thru-hole 306 of the panel insert 110 has a diameter 410 that is sized to fit a fastener or the like. The flange 304 and/or the bushing 302 is bonded to panel 102 with an adhesive 420 or the like, so the panel insert 110 may be referred to as a bonded panel insert.

After installation, there may be a need or desire to remove the panel insert 110 from the panel 102. For example, a panel insert 110 may become corroded or damaged such that replacement is desired. When the panel insert 110 is bonded to the panel 102 as is illustrated in FIG. 4, it may be challenging to extract the panel insert 110 without causing damage to the panel 102. For example, certain prior methods of extracting a panel insert 110 may include prying the panel insert 110 from the top side 104 of the panel 102, which can cause damage to the top side 104. Examples of the present disclosure provide a removal tool that is configured to safely, efficiently, and effectively extract the panel insert 110 (or other types of panel inserts) from the panel 102.

Figure 5:
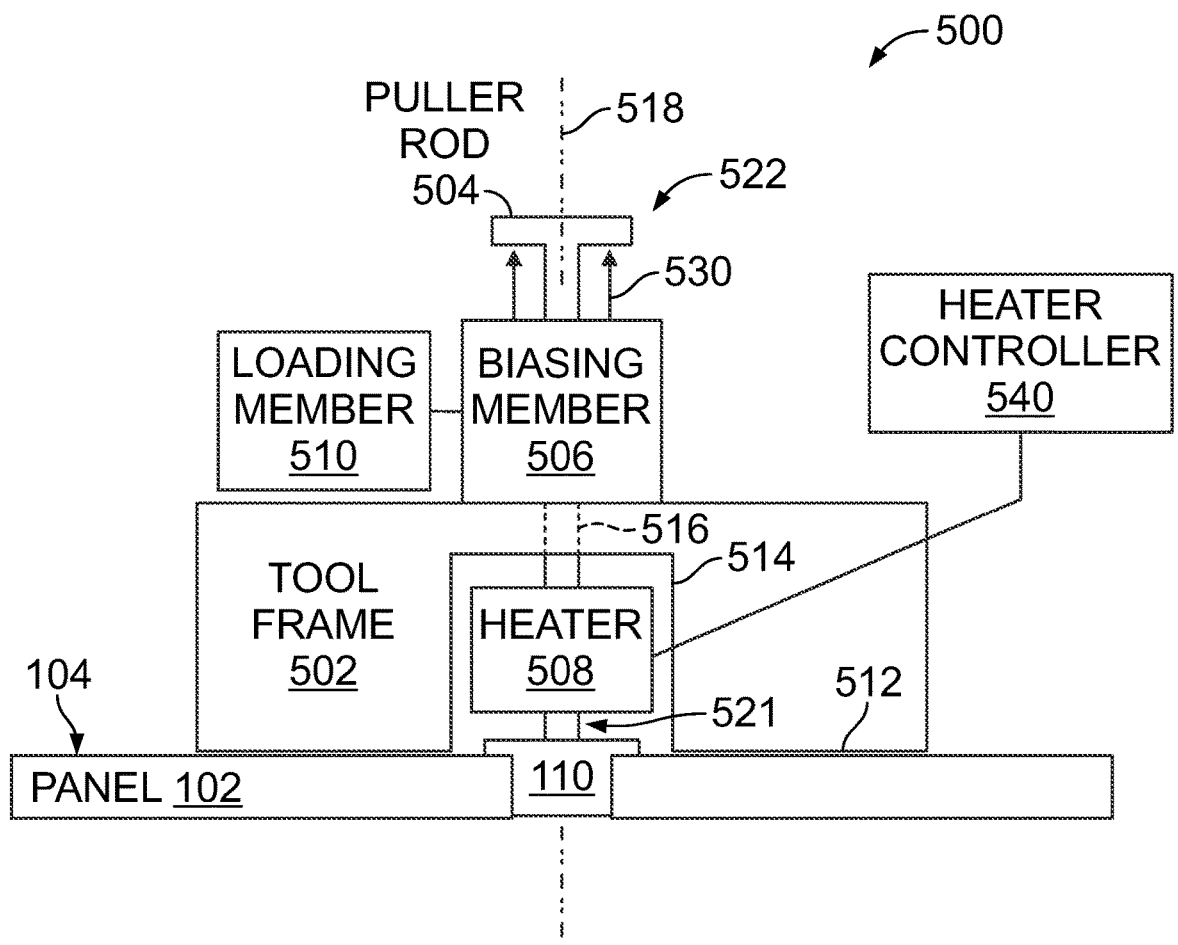
FIG. 5 illustrates a schematic diagram of a removal tool, according to an example of the present disclosure.

FIG. 5 illustrates a schematic diagram of a removal tool 500, according to an example of the present disclosure. The removal tool 500 is an example of a system for removing the insert panel 110 from the panel 102. In at least one example, the removal tool 500 is configured to rest (directly or indirectly) on a side of the panel 102 from which a panel insert 110 is installed. For example, the removal tool 500 can be placed on the top side 104 of the panel 102 to extract the panel insert 110. The removal tool 500 engages the panel insert 110, and applies a pulling force generally perpendicular to the panel 102. The removal tool 500 also applies heat to (or proximate to) the panel insert 110 to soften or melt the adhesive 420 (shown in FIG. 4) that bonds the panel insert 110 to the panel 102. When the adhesive 420 is sufficiently softened or melted, the pulling force applied by the removal tool 500 extracts the panel insert 110 from the hole 402 in panel 102.

In at least one example, the removal tool 500 is an assembly that includes a tool frame or housing 502, a puller rod 504, a biasing member 506, and a heater 508. The tool frame or housing 502 is a structural element that supports the removal tool 500 on the panel 102. The tool frame or housing 502 has a bottom surface 512 that contacts (directly or indirectly) the top side 104 of the panel 102. The bottom surface 512 may be generally flat to interface with the top side 104 of the panel 102, which may also be generally flat. In at least one other example, the bottom surface 512 may be contoured to mirror a corresponding contour on the top side 104 of the panel 102. When placed on the panel 102, the tool frame or housing 502 is able to straddle the panel insert 110 via an insert opening 514. The insert opening 514 is a void or aperture in the tool frame 502 that may be placed over the panel insert 110 so that portions of the tool frame 502 contact the top side 104 of the panel on multiple sides of the panel insert 110. The tool frame or housing 502 therefore extends around and encompasses the panel insert 110 on the top side 104, thereby distributing pressure or stress from the tool frame or housing 502 around the panel insert 110.

The puller rod 504 is an elongated member that is slidably disposed through a guide opening 516 in the tool frame 502. The puller rod 504 is configured to move axially (up and down, as shown in FIG. 5) in relation to the tool frame 502 along axis 518. The guide opening 516 is configured to direct the movement of the puller rod 504 in the axial direction. One end 521 of the puller rod 504 is configured to engage the panel insert 110. For example, end 521 of the puller rod 504 may screw into threads in the thru-hole 306 of the panel insert 110 (shown in FIG. 4). Optionally, the puller rod 504 may be inserted through the thru-hole 306 of panel insert 110 so that the end 521 of the puller rod 504 engages the panel insert 110.

The biasing member 506 is configured to apply an axial force 530 to the puller rod 504 (for example, along axis 518) away from the tool frame 502, and toward the other end 522 of the puller rod 504. The axial force 530 is therefore away from the panel insert 110 and the panel 102. The biasing member 506 can include a spring (for example, a coil spring) or another elastic member that stores potential energy when loaded (that is, compressed or stretched), and applies the axial force 530 in the opposite direction with the potential energy. The biasing member 506 can be disposed between the tool frame or housing 502 and the other end 522 of the puller rod 504 as shown in FIG. 4 5. Optionally, the biasing member 506 can be disposed at other positions. The biasing member 506 can mechanically couple with the puller rod 504 at or near the end 522, or at another position along a length of the puller rod 504.

The heater 508 is configured to apply heat to the panel insert 110. The heater 508 is positioned proximate to the panel insert 110 so that heat generated by the heater 508 acts to soften or melt the adhesive 420 used to bond the panel insert 110 to the panel 102. For example, the heater 508 can contact the panel insert 110, or can be positioned close to the panel insert 110 to increase the temperature of the panel insert 110 and/or the environment around the panel insert 110. Heat transfer from the heater 508 to the panel insert 110 may be via conduction, convection, or radiation. Also shown is a heater controller 540 that controls the heat output of the heater 508.

The removal tool 500 can include additional elements as desired. For example, the removal tool 500 may include a loading member 510, which is configured to preload the biasing member 506 by a predetermined amount. For example, the loading member 510 can compress the biasing member 506 by a predetermined amount to store potential energy. The potential energy in turn creates the axial force 530 applied by the biasing member 506 to the puller rod 504. In another example, the loading member 510 may stretch biasing member 506 by a predetermined amount to store potential energy. The removal tool 500 can include additional features, such as shown and described in U.S. Pat. No. 11,167,401, entitled "Panel Insert Removal Tool and Method," which is hereby incorporated by reference in its entirety.

Figure 6:
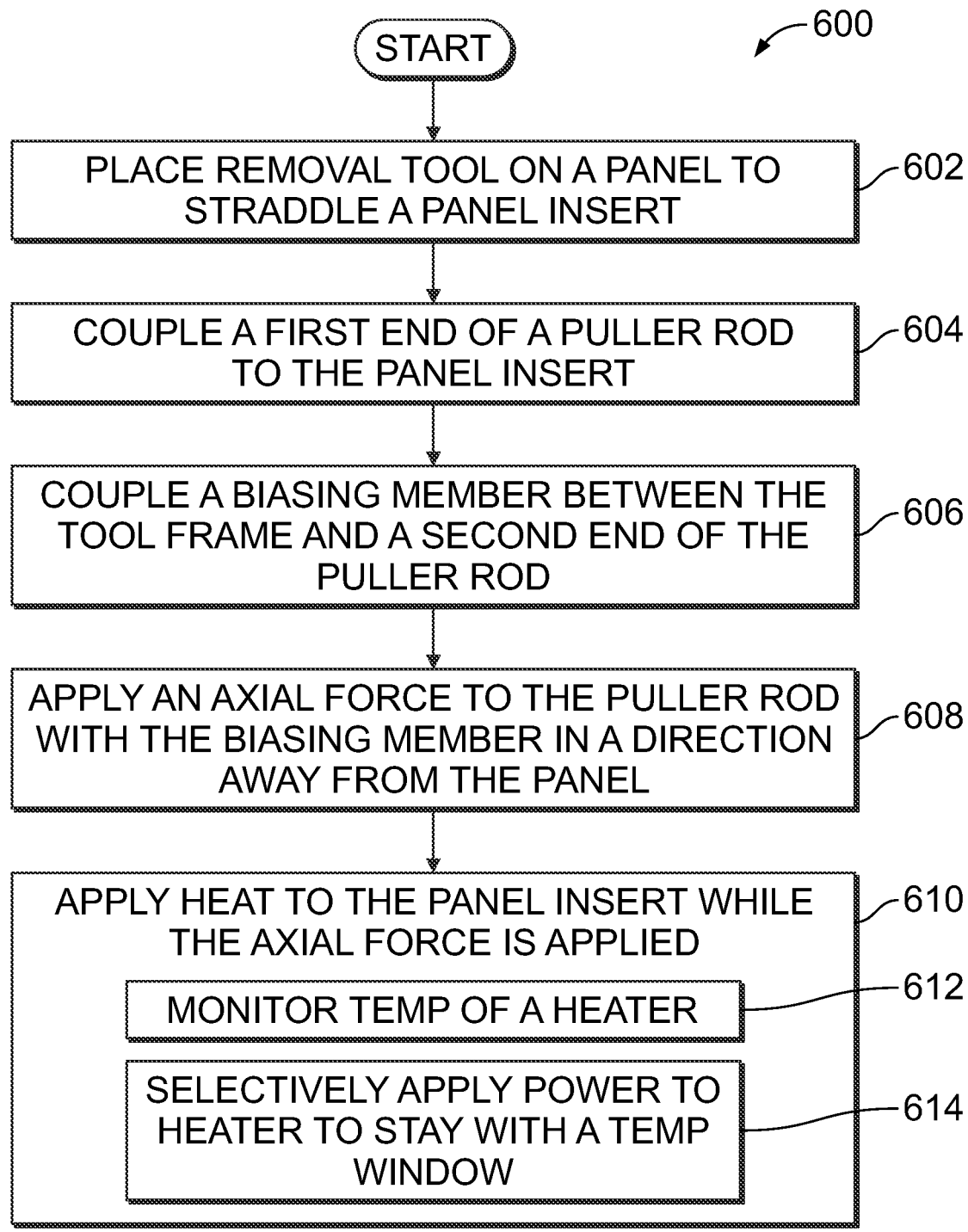
FIG. 6 illustrates a flow chart of a method of extracting a panel insert from a panel, according to an example of the present disclosure.

FIG. 6 illustrates a flow chart of a method 600 of extracting a panel insert from a panel, according to an example of the present disclosure. Referring to FIGS. 1-6, the panel insert 110 is initially installed in the panel 102 and bonded to the panel 102 as illustrated in FIG. 4. At 602, the removal tool 500 is placed on the panel 102 so that the tool frame 502 straddles the panel insert 110. At 604, with the tool frame 502 situated over the panel insert 110, one end 521 of the puller rod 504 is coupled, engaged, attached, or connected to the panel insert 110. For example, the puller rod 504 can be inserted through the thru-hole 306 in the panel insert 110 from its bottom until a head at the end 521 of the puller rod 504 contacts the bottom of the panel insert 110. In another example, the puller rod 504 can be inserted through the thru-hole 306 in the panel insert 110 from the top side 104 of panel 102 to retract a ball lock, and is pressed through the panel insert 110 until the end 521 of the puller rod 504 extends through panel insert 110 and the ball lock returns to an extended state.

The puller rod 504 is configured to pull the panel insert 110 generally perpendicular to the top side 104 of the panel 102. Thus, at 606, the biasing member 506 (for example, a spring) is coupled between the tool frame 502 and the other end 522 of the puller rod 504. At 608, the biasing member 506 applies an axial force 530 to the puller rod 504 in a direction away from the panel 102. At 610, the heater 508 also applies heat to the panel insert 110 while the axial force 530 is applied the by biasing member 506. For example, at 612, the heater controller 540 can monitor a temperature of the heater 508, and at 614, selectively apply power to the heater 508 to stay within a temperature window. When the heat softens or melts the adhesive 420 to a certain point, the axial force 530 overcomes the bond formed by the adhesive 420, and extracts the panel insert 110 from the panel 102. The extracted panel insert 110 is removed from the puller rod 504, and the removal tool 500 may be moved to another panel insert 110 on the panel 102. The method 600 can be repeated for a number of panel inserts 110.

The systems and methods described herein apply consistent force and controlled heat to remove panel inserts 110 from the panel 102. The systems and methods described herein are unlikely to damage the panel 102 when extracting the panel insert 110, and are easily controlled by operators without need for specialized skills.

As used herein, the term "controller," "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein.

Such are exemplary only, and are thus not intended to limit in any way the definition and/or meaning of such terms. For example, the heater controller 540 may be or include one or more processors that are configured to control heating operation, as described herein.

The heater controller 540 is configured to execute a set of instructions that are stored in one or more data storage units or elements (such as one or more memories), in order to process data. For example, the heater controller 540 may include or be coupled to one or more memories. The data storage units may also store data or other information as desired or needed. The data storage units may be in the form of an information source or a physical memory element within a processing machine.

The set of instructions may include various commands that instruct the heater controller 540 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the heater controller 540. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the heater controller 540 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and nonvolatile RAM (NVRAM) memory. The above data storage unit types are exemplary only, and are thus not limiting as to the types of memory usable for storage of a computer program.

Figure 7:
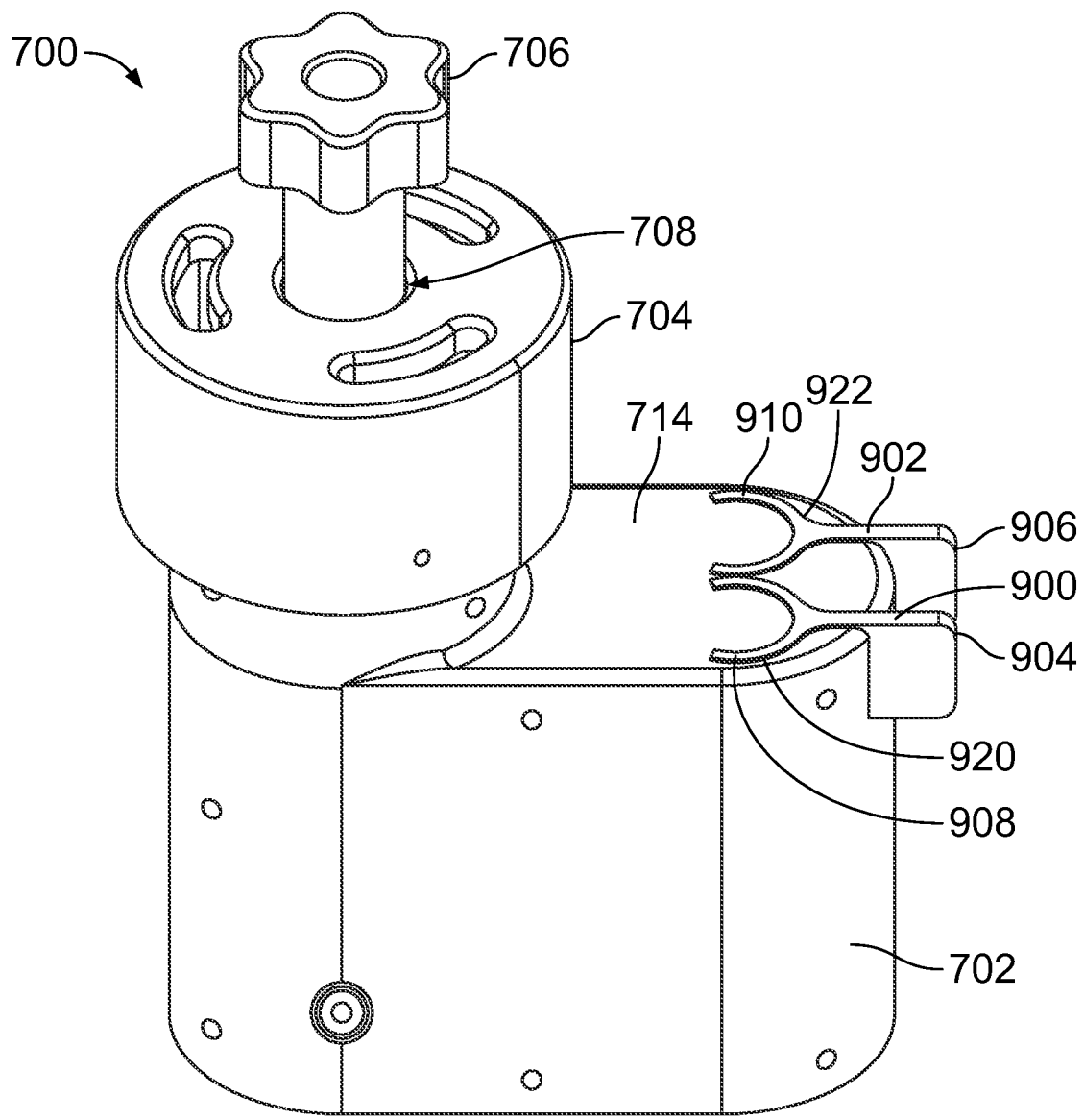
FIG. 7 illustrates a perspective side view of a system for removing a panel insert from a panel, according to an example of the present disclosure.

FIG. 7 illustrates a perspective side view of a system 700 for removing a panel insert (such as the panel insert 110 shown in FIGS. 1-5) from a panel (such as the panel 102 shown in FIGS. 1, 4, and 5), according to an example of the present disclosure. The system 700 is an example of the removal tool 500 shown and described with respect to FIG. 5. In at least one example, the system 700 is configured to operate to remove the panel insert 110 from the panel 102 as shown and described with respect to FIG. 6.

The system 700 includes a main housing 702. A loading cap 704 is rotationally coupled to the main housing 702. The loading cap 704 is an example of the loading member 510, shown and described with respect to FIG. 5. A tension knob 706 extends into a central channel 708 formed through the loading cap 704 and couples to a puller rod (such as the puller rod 504 shown in FIG. 5) within the main housing 702.

Figure 8:
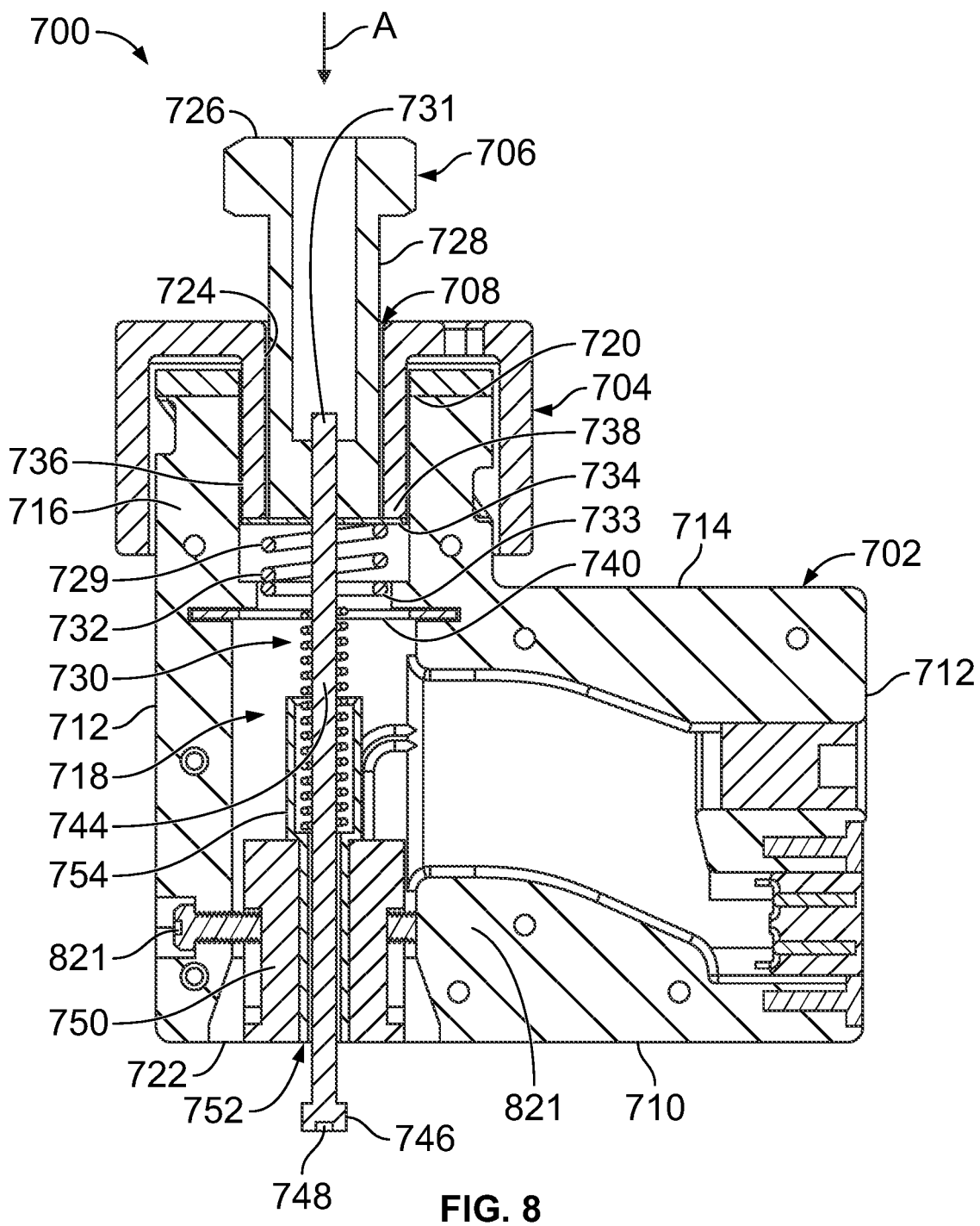
FIG. 8 illustrates a transverse cross-sectional view of the system for removing the panel insert from the panel, according to an example of the present disclosure.

FIG. 8 illustrates a transverse cross-sectional view of the system 700 for removing the panel insert from the panel, according to an example of the present disclosure. The main housing 702 includes a base 710 that is configured to rest on a surface of one or more panels. In at least one example, the base 710 is flat. As another example, the base 710 can be contoured to conform to a surface of the panel(s). Outer walls 712 extend upwardly from the base 710. The outer walls 712 connect to an upper wall 714. A neck 716 upwardly extends from a portion of the upper wall 714. A linear passage 718 extends through and from the neck 716 and the base 710. In particular, the passage 718 extends from and through an upper end 720 of the neck 716, and to and through an axially aligned lower surface 722 of the base 710.

The loading cap 704 rotationally couples to the neck 716. As shown, the loading cap 704 includes a central sleeve 724 that defines the central passage 708.

The tension knob 706 includes an engagement head 726, and a stem 728 that downwardly extends from the engagement head 726. The stem 728 secures to an upper end 731 of the puller rod 730, which can be a bolt, for example. For example, the stem 728 can threadably secure to the upper end 731 of the puller rod 730. As another example, the stem 728 can snapably secure to the upper end 731.

A tension spring 732 is compressed between a washer 734 that abuts into a lower end 736 of the sleeve 724 of the loading cap 704, and a lower end 738 of the stem 728, and a washer 740 within the main housing 702. For example, the washer 740 can be retained within the slots formed in the main housing 702 underneath the neck 716. Optionally, instead of the washer 740, the tension spring 732 can be compressed between the washer 734 and a fixed internal wall of the main housing 702. Also, optionally, instead of the washer 734, the tension spring 732 can abut directly into the lower end 736 of the sleeve 724, and/or the lower end 738 of the stem 728.

As shown, the tension spring 732 includes a first end 729 that abuts into the washer 734, and an opposite end 733 that abuts into the washer 740. As shown, the tension spring 732 is fully contained within the main housing 702. In at least one example, the tension spring 732 can be contained within the neck 716.

The puller rod 730 extends through a central opening of the tension spring 732, through central openings of the washers 734 and 740, and into the passage 718. For example, a shaft 744 of the puller rod 730 extends through the passage 718, and a distal end 746 extending from the shaft 744 extends outwardly from the passage 718. The distal end 746 is configured to engage a panel insert, as described herein. The distal end 746 can include an expanded portion 748 that is configured to abut against an underside of the bushing 302 (shown in FIG. 3). Optionally, the distal end 746 can be configured to threadably engage an internal diameter of the bushing 302. As another example, the distal end 746 is configured to snapably engage the panel insert.

A heater 750 is secured within the passage 718, and is configured to apply heat to the panel insert and the panel, as described herein. In at least one example, the heater 750 is contained within the main housing 702. The heater 750 is an example of the heater 508 shown in FIG. 5. The heater 750 has a lower portion that is at and/or proximate to (such as within 6 inches or less) a lower surface of the base 710. The heater 750 can be configured to axially move within the passage 718. The heater 750 includes an axial passage 752, through which the shaft 744 of the puller rod 730 extends. One or more heat isolating components 754, such as metallic and/or plastic heat sheaths, are disposed around portions of the shaft 744. The heat isolating components 754 shield the shaft 744 from heat generated by the heater 750.

As described herein, the system 700 for removing the panel insert 110 from the panel 102 includes the main housing 702. The loading cap 704 is coupled to the main housing 702. The tension knob 706 is also coupled to the main housing 702. The tension knob is configured to couple to the puller rod 730. The tension spring 732 is within the main housing, 702. The loading cap 704 is configured to set the tension spring 732 at an initial or first tension (such as a fully compressed position), and the tension knob 706 is configured to set the tension spring 732 at a subsequent or second tension (for example, a desired compression/tension). The heater 750 is disposed within the main housing 702. The heater 750 is configured to apply heat to the panel insert 110.

Figure 9:
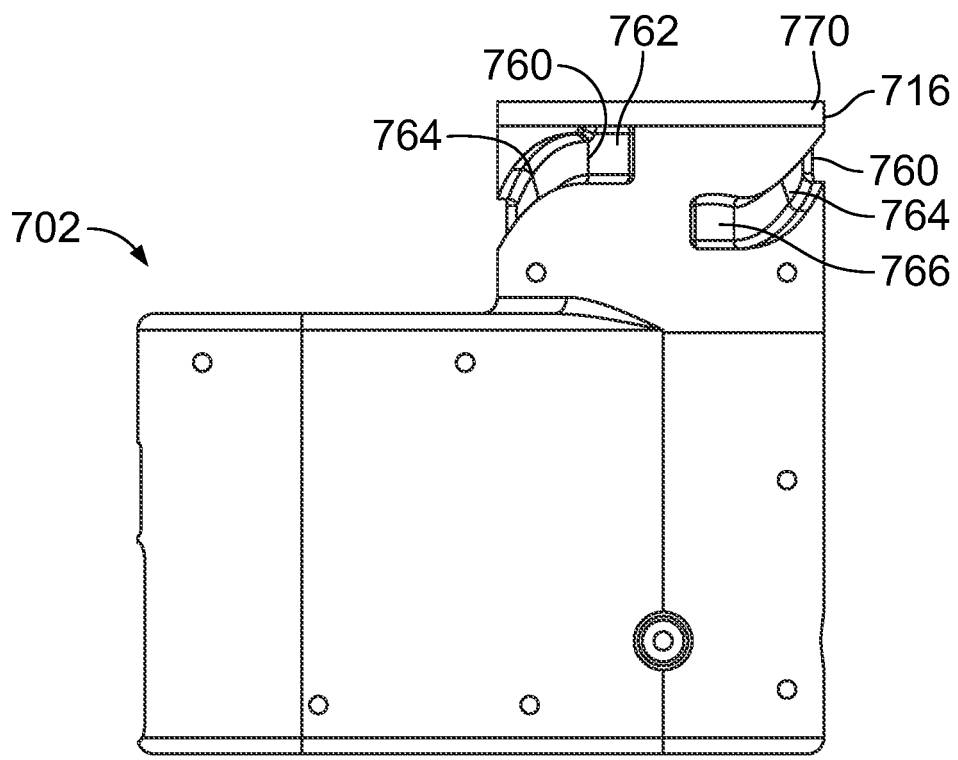
FIG. 9 illustrates a lateral view of a main housing, according to example of the present disclosure.
Figure 10:
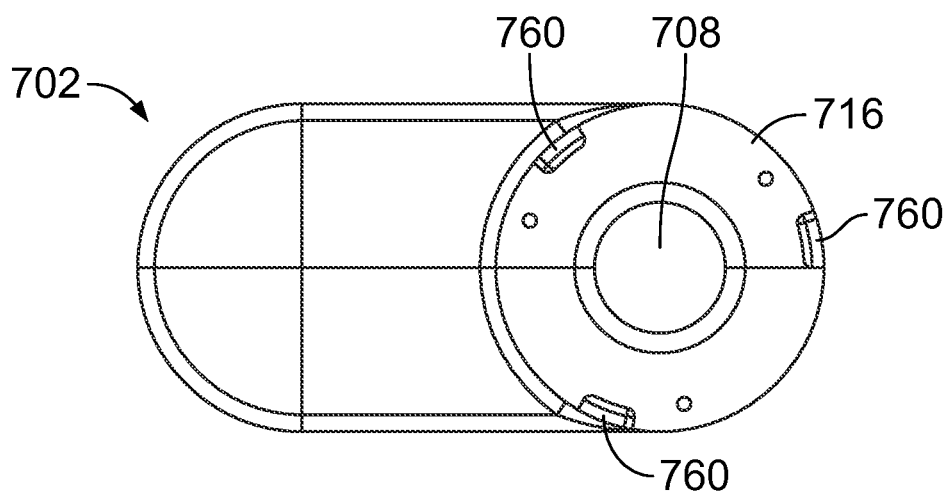
FIG. 10 illustrates a top view of the main housing of FIG. 9.

FIG. 9 illustrates a lateral view of a main housing 702, according to example of the present disclosure. FIG. 10 illustrates a top view of the main housing 702 of FIG. 9. Referring to FIGS. 9 and 10, the neck 716 includes guide channels 760. Each guide channel 760 includes an upper segment 762, and an arcuate segment 764 connected to the upper segment 762. The arcuate segment 764 downwardly curves around a portion of the neck 716. The arcuate segment 764 connects to a lower end notch 766. Each guide channel 760 is configured to retain a bearing of the loading cap 704 (shown in FIG. 8).

As shown, the neck 716 includes three guide channels 760 for three bearings of the loading cap 704. The guide channels 760 downwardly curve around an outer portion of the neck 716 from the upper segments 762 to the notches 766. The neck 716 can include more or fewer guide channels 760 than shown. For example, the neck 716 can include a single guide channel 760, or four or more guide channels 760, depending on the number of bearings of the loading cap 704.

An upper end of the neck 716 can also include a circumferential flange 770. The flange 770 is configured to clasp onto a circumferential ledge of the loading cap 704 to prevent the loading cap 704 from disconnecting from the neck 716. Optionally, the neck 716 may not include the flange.

Figure 11:
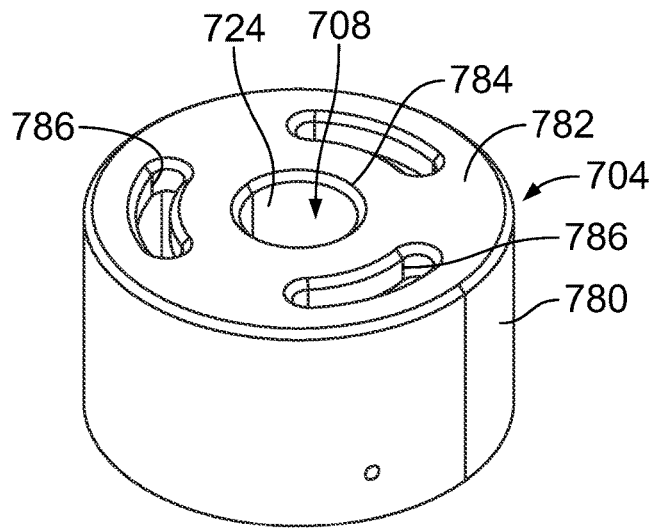
FIG. 11 illustrates an isometric top view of a loading cap, according to an example of the present disclosure.
Figure 12:
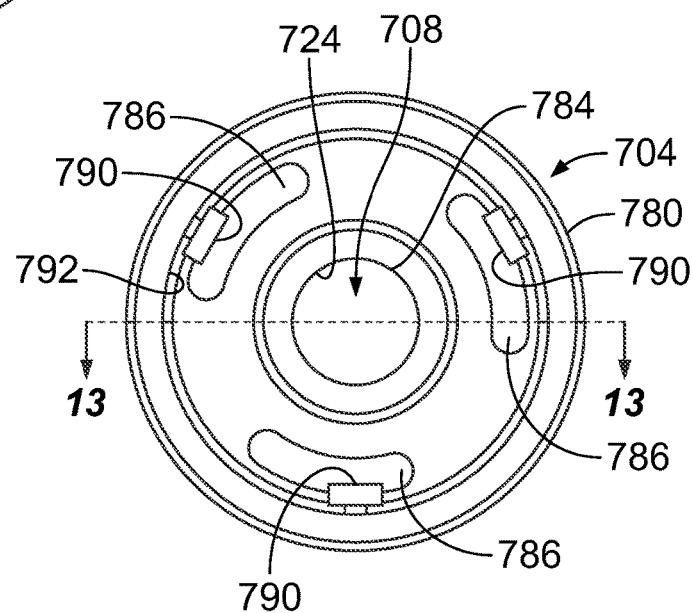
FIG. 12 illustrates a bottom view of the loading cap.
Figure 13:
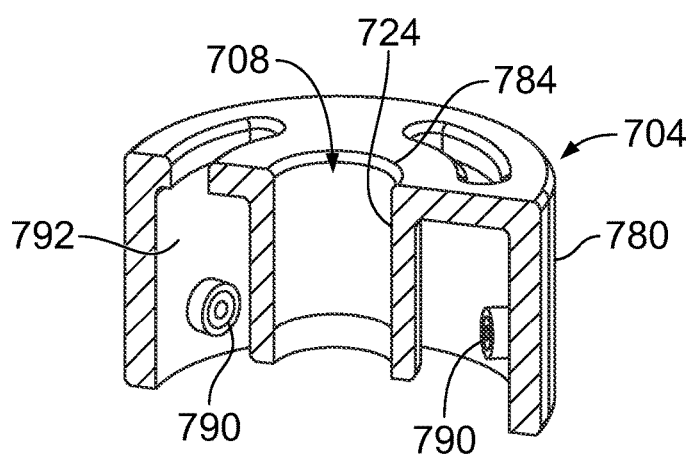
FIG. 13 illustrates a cross-sectional isometric view of the loading cap through line 13-13 of FIG. 12.

FIG. 11 illustrates an isometric top view of the loading cap 704, according to an example of the present disclosure. FIG. 12 illustrates a bottom view of the loading cap 704. FIG. 13 illustrates a cross-sectional isometric view of the loading cap 704 through line 13-13 of FIG. 12. The loading cap 704 includes an outer circumferential wall 780 that connects to an upper wall 782. The sleeve 724 downwardly extends from an interior edge 784 of the upper wall 782.

Figure 14:
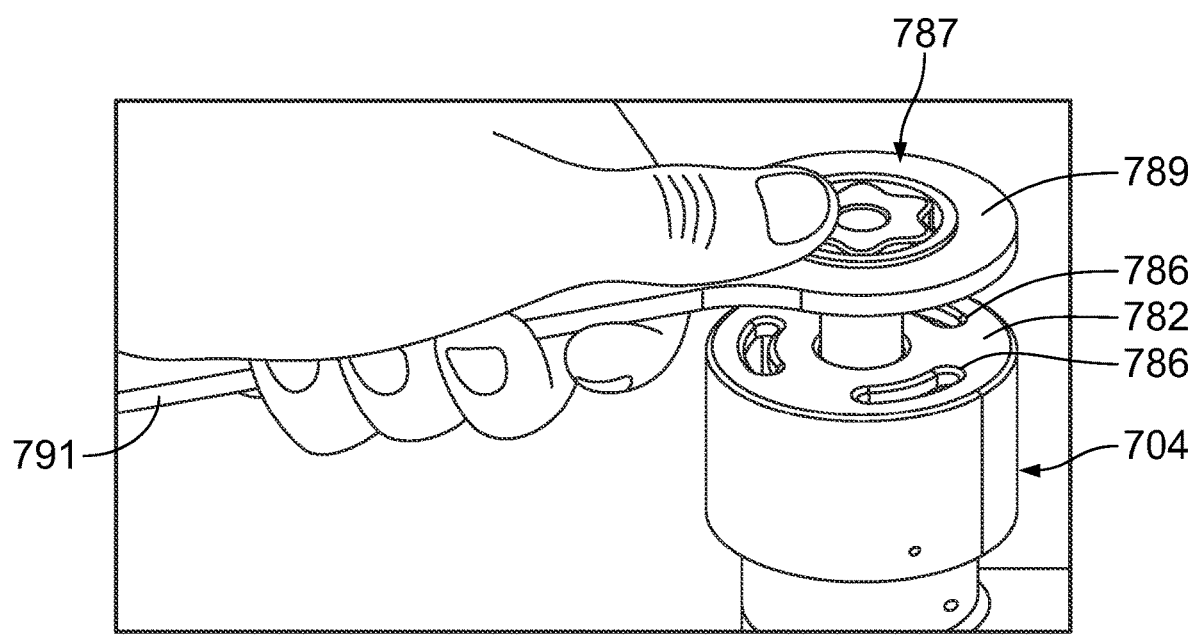
FIG. 14 illustrates a perspective top view of a hand tool positioned above the loading cap, according to an example of the present disclosure.

FIG. 14 illustrates a perspective top view of a hand tool 787 (for example, a torquing tool, such as a wrench) positioned above the loading cap 704, according to an example of the present disclosure. Referring to FIGS. 11-14, arcuate tool-engagement channels 786 can be formed into and/or through the upper wall 782. The tool-engagement channels 786 are configured to receive and removably retain portions of the hand tool 787 (for example, studs downwardly extending from an operative ring 789 extending from a handle 791) that can be used to rotate the loading cap 704. Optionally, the loading cap 704 can include more or fewer tool-engagement channels 786 than shown. In at least one example, the loading cap 704 may not include the tool-engagement channels.

Bearings 790 are secured to interior surfaces 792 of the circumferential wall 780. The bearings 790 can be rotationally secured to the interior surfaces 792. The bearings 790 can be wheels, for example. The bearings 790 coincide with the guide channels 760 of the neck 716 (shown in FIGS. 9 and 10). That is, the number of bearings 790 equals the number of guide channels 760. The loading cap 704 can include more or fewer bearings 790 than shown.

Figure 15:
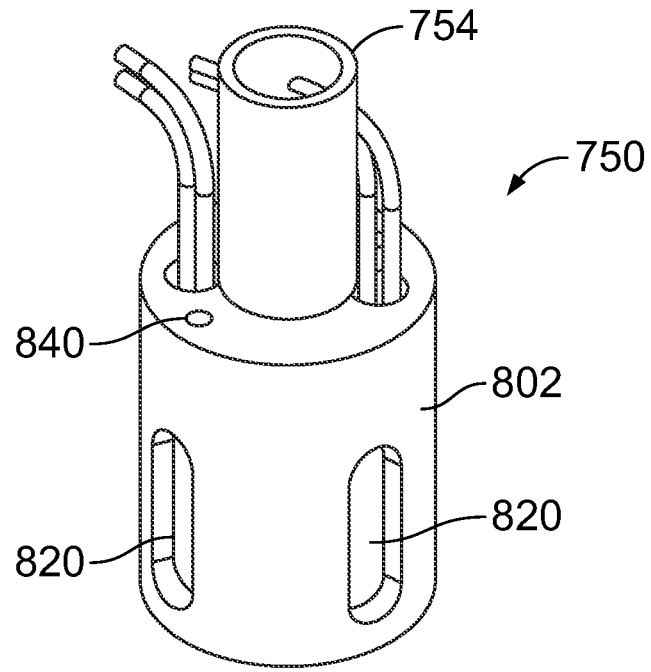
FIG. 15 illustrates an isometric top view of a heater, according to an example of the present disclosure.
Figure 16:
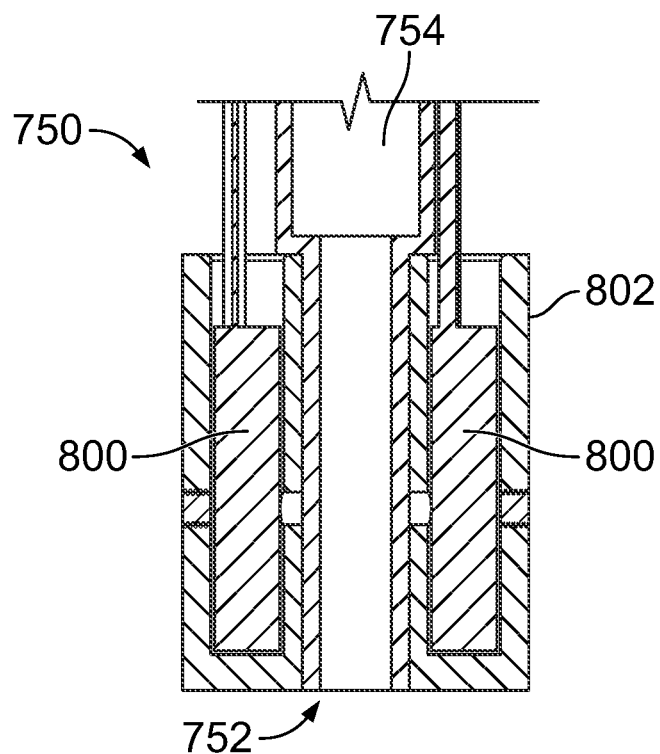
FIG. 16 illustrates a transverse cross-sectional view of the heater of FIG. 15.

FIG. 15 illustrates an isometric top view of the heater 750, according to an example of the present disclosure. FIG. 16 illustrates a transverse cross-sectional view of the heater 750 of FIG. 15. Referring to FIGS. 15 and 16, the heater 750 includes one or more heating elements 800 (such as heating coils) disposed around the passage 752. A heat isolating component 754, such as an insulating plastic sheath, is disposed within the passage 752, between the heating elements 800 and the shaft 744 of the puller rod 730 (shown in FIG. 15).

The heater 750 can include an outer body 802 that retains the heating elements 800. The outer body 802 can be formed of a metal, such as Aluminum. The outer body 802 can also include recessed areas 820, such as grooves. The recessed areas 820 are configured to receive and retain reciprocal structures 821 (shown in FIG. 8), such as tabs, posts, nubs, fasteners, or the like, which secure the heater 750 within the main housing 702. The recessed areas 820 can be longer than engagement portions of the reciprocal structures 821, so as to allow the heater 750 to axially move within the main housing 702. The heater 750 can also include a thermocouple cavity 840, such as on an upper portion of the outer body 820.

The heat isolating component 754 provides a heat shield that surrounds the shaft 744 within the passage 752. The heat isolating component 754 is configured to reduce a temperature within the passage 752 when the heating elements 800 are active. As such, the heating isolating component 754 is configured to reduce heat applied to the shaft 744. Alternatively, the heater 750 may not include the heat isolating component 754.

Referring to FIGS. 7-16, the system 700 is disposed on one or more panels, such that an operative end of the puller rod 730 couples to a panel insert (such as the panel insert 110 shown in FIGS. 1-5) to be removed from the panel(s). An opposite end of the puller rod 730 is secured to the stem 728 of the tension knob 706.

An individual then rotates the loading cap 704, either by hand, or via a hand tool that engages the tool-engagement channels 786. As the loading cap 704 rotates relative to the neck 716, the bearings move downwardly through the guide channels 760, thereby forcing the loading cap 704 downwardly in the direction of arrow A (shown in FIG. 8), thereby compressing the tension spring 732.

When the loading cap 704 is rotated to a desired position, such as at a point at which the tension spring 732 is fully compressed, the tension knob 706 is then rotated. For example, the stem 728 of the tension knob 706 can be threadably coupled to the loading cap 704 (such as threadable engagement with the sleeve 724). Rotating the tension knob 706 in a particular direction therefore moves the tension knob 706 and the puller rod 730 downward. Before such rotation of the tension knob 706, the tension spring 732 may not exert a spring force into the tension knob 706, as the loading cap 704 bears the entire spring force of the tension spring 732. As such, the tension knob 706 can continue to be rotated to move the puller rod 730 to a desired position corresponding to a desired tension of the tension spring 732. Once the tension knob 706 is operated to move the puller rod 730 to the desired position, the loading cap 704 can be rotated in an opposite direction, to decompress the tension spring 732, thereby reducing spring force. The loading cap 704 continues to be rotated in the opposite direction that decompresses the tension spring 732 until the tension spring 732 exerts the spring force into the tension knob 706, which is at the desired position for exerting tension into the tension spring 732.

Optionally, the tension knob 706 can be configured to be operated differently than via rotation. For example, the tension knob 706 can be configured to be pushed and pulled in relation to the loading cap 704.

Figure 17:
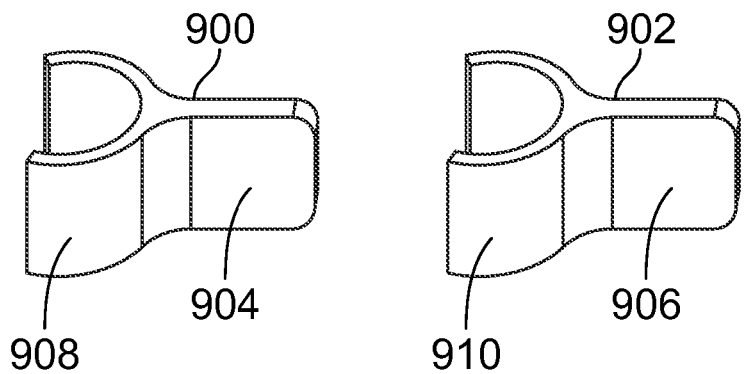
FIG. 17 illustrates a perspective top view of tension keys, according to an example of the present disclosure.

FIG. 17 illustrates a perspective top view of tension keys 900 and 902, according to an example of the present disclosure. The tension keys 900 and 902 each have a handle 904 and 906, respectively, extending from a cuff 908 and 910, respectively. The tension keys 900 and 902 may have different heights.

Referring to FIGS. 7-17, the tension keys 900 and 902 are configured to be disposed between the tension knob 706 and the loading cap 704 to set a desired tension of the tension spring 732. For example, the cuffs 908 or 910 are configured to wrap around a portion of the stem 728 between the engagement head 726, and upper wall 782 of the loading cap 704. As such, the tension keys 900 and 902 prevent the loading cap 704 from retreating further toward the engagement head 726 of the tension knob 706, thereby maintaining a particular compression and tension within the tension spring 732.

Each of the tension keys 900 and 902 can have a different height, which defines a particular tension within the tension spring 732 when the tension keys 900 and 902 are disposed between the tension knob 706 and the loading cap 704, as described. For example, the tension key 900 has a first height, and the tension key 902 has a second height, which differs from the first height.

A plurality of tension keys can be used. For example, three or more tension keys can be used. As another example, a single tension key can be used. Alternatively, the system 700 may not include any tension keys.

As shown in FIG. 7, for example, the main housing 702 can include key channels 920 and 922, such as can be formed through the upper wall 714. The cuffs 908 and 910 can be retained within the key channels 920 and 922, respectively, with the respective handles 904 and 906 extending outwardly away from the main housing 702. As such, an individual can grasp the handles 904 and 906 to remove the tension keys 900 and 902 from the main housing 702.

The different tension keys 900 and 902 allow for a desired settings for tension. For example, one of the tension keys 900 is configured to set a first tension of the tension spring 732, such as 40 pounds of tension, and the other of the tension keys 902 is configured to set a second tension of the tension spring 732, such as 60 pounds of tension. Accordingly, the system 700 can be used on a variety of different types of panels without damaging the panels.

Optionally, the tension keys 900 and 902 may be separate and distinct from the main housing 702 and not configured to be removably retained by the main housing 702. As another example, the tension keys 900 and 902 can be retained within a compartment of or otherwise coupled to the main housing 902. Optionally, the system 700 may not include the tension keys.

Referring again to FIGS. 7-17, after the desired spring force of the tension spring 732 is set by the tension knob 706, the system 700 is operated to remove the panel insert, such as described herein with respect to FIGS. 1-6.

As shown and described, the heater 750 is disposed within the main housing 702. That is, the heater 750 may not have portions extending outwardly from, or otherwise exposed in relation to, the main housing 702. As such, the main housing 702 shields individuals from the heater 750, and ensures that generated heat is directed onto the panel insert, instead of inefficiently radiating outside of the main housing 702.

The loading cap 704 is used to initially set the tension (for example, compression) of the tension spring 732. The tension knob 706 is then operated to subsequently set the tension spring 732 at a desired tension.

Figure 18:
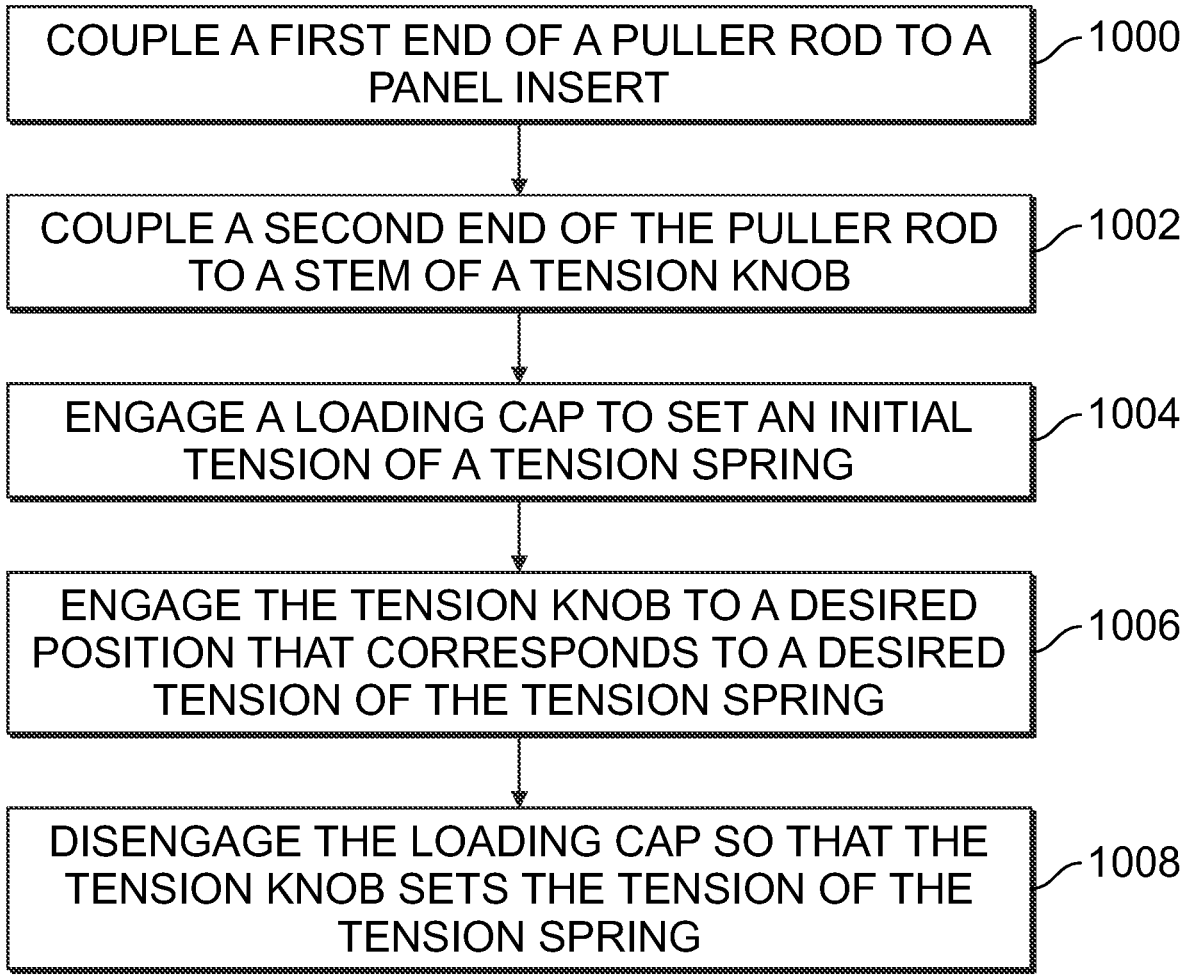
FIG. 18 illustrates a flow chart of a method for removing a panel insert from a panel, according to an example of the present disclosure.

FIG. 18 illustrates a flow chart of a method for removing a panel insert from a panel, according to an example of the present disclosure. Referring to FIGS. 7-18, at 1000, a first end (for example, the distal end 746) of the puller rod 730 is coupled to a panel insert, such as the panel insert 110 shown in FIGS. 1-5. At 1002, a second end (for example, the upper end 731) of the puller rod 730 is coupled to the stem 728 of the tension knob 706. At 1004, the loading cap 704 is then engaged, such as via rotation either by hand or the tool 787, to set an initial tension (for example, a maximum compression) of the tension spring 732. At 1006, the tension knob 706 is then engaged, such as through rotation by hand, to a desired position that corresponds to a desired tension of the tension spring 732. At 1008, the loading cap is then disengaged (in relation to the tension spring 732, such as via rotation in an opposite direction) so that the tension spring 732 exerts force into the tension knob 706, which thereby sets the tension of the tension spring 732 for removal of the panel insert 110 from the panel. The method can the proceed to 608 and 610, as shown and described with respect to FIG. 6, for example.

Further, the disclosure comprises examples according to the following clauses:

Clause 1. A system for removing a panel insert from a panel, the system comprising:
 a main housing;
 a loading cap coupled to the main housing;
 a tension knob coupled to the main housing, wherein the tension knob is configured to couple to a puller rod;
 a tension spring within the main housing, wherein the loading cap is configured to set the tension spring at an initial tension, and wherein the tension knob is configured to set the tension spring at a subsequent tension; and
 a heater configured to apply heat to the panel insert.

Clause 2. The system of Clause 1, wherein the tension knob comprises:
 an engagement head; and
 a stem extending from the engagement head, wherein the stem extends into a central channel formed through the loading cap.

Clause 3. The system of Clauses 1 or 2, wherein the tension knob couples to an upper end of the puller rod within the main housing.

Clause 4. The system of any of Clauses 1-3, wherein the main housing comprises a neck, and wherein the loading cap rotationally couples to the neck.

Clause 5. The system of Clause 4, wherein the neck comprises one or more guide channels, wherein the loading cap comprises one or more bearings, and wherein the one or more guide channels retain the one or more bearings.

Clause 6. The system of Clause 5, wherein the one or more guide channels comprise:
an upper segment;
an arcuate segment connected to the upper segment, wherein the arcuate segment downwardly curves around a portion of the neck; and
a notch connected to the arcuate segment.

Clause 7. The system of any of Clauses 4-6, wherein the neck comprises a circumferential flange configured to prevent the loading cap from disconnecting from the neck.

Clause 8. The system of any of Clauses 1-7, wherein the tension spring is fully contained within the main housing.

Clause 9. The system of any of Clauses 1-8, wherein the heater is contained within the main housing.

Clause 10. The system of Clause 9, wherein the heater is moveable within the main housing.

Clause 11. The system of any of Clauses 1-10, wherein a portion of a shaft of the puller rod passes through the heater.

Clause 12. The system of Clause 11, wherein the heater comprises one or more heat isolating components between the heater and the portion of the shaft of the puller rod.

Clause 13. The system of any of Clauses 1-12, wherein the loading cap comprises one or more tool-engagement channels configured to receive one or more portions of a hand tool.

Clause 14. The system of any of Clauses 1-13, further comprising one or more tension keys configured to be disposed between the tension knob and the loading cap to set the tension spring at the subsequent tension.

Clause 15. The system of Clause 14, wherein the one or more tension keys are removably retained with one or more key channels of the main housing.

Clause 16. The system of Clauses 14 or 15, wherein the one or more tension keys comprise a plurality of tension keys, wherein each of the plurality of tension keys has a different height.

Clause 17. A method for removing a panel insert from a panel, the method comprising:
setting, by a loading cap coupled to a main housing, an initial tension of a tension spring disposed within the main housing;
setting, by a tension knob coupled to the main housing and an upper end of a puller rod within the main housing, a subsequent tension of the tension spring; and
applying, by a heater, heat to the panel insert.

Clause 18. The method of Clause 17, wherein the setting the initial tension comprises rotating the loading cap relative to a neck of the main housing.

Clause 19. The method of Clauses 17 or 18, further comprising disposing one or more tension keys between the tension knob and the loading cap to set the tension spring at the subsequent tension.

Clause 20. A system for removing a panel insert from a panel, the system comprising:
a main housing including a neck including one or more guide channels, wherein the one or more guide channels include (a) an upper segment, (b) an arcuate segment connected to the upper segment, wherein the arcuate segment downwardly curves around a portion of the neck, and (c) a notch connected to the arcuate segment;
a loading cap rotationally coupled to the neck of the main housing, wherein the loading cap includes one or more bearings, and wherein the one or more guide channels retain the one or more bearings;
a tension knob coupled to the main housing, wherein the tension knob is couples to an upper end of a puller rod within the main housing, wherein the tension knob includes an engagement head, and a stem extending from the engagement head, wherein the stem extends into a central channel formed through the loading cap;
a tension spring contained within the main housing, wherein the loading cap is configured to set the tension spring at an initial tension, and wherein the tension knob is configured to set the tension spring at a subsequent tension; and
a heater contained within the main housing, wherein the heater is configured to apply heat to the panel insert, wherein a portion of a shaft of the puller rod passes through the heater, and wherein the heater comprises one or more heat isolating components between the heater and the portion of the shaft of the puller rod.

As described herein, examples of the present disclosure efficient and effective systems and methods for removing an insert from a panel.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for removing a panel insert from a panel, the system comprising:
   a main housing;
   a loading cap coupled to the main housing;
   a tension knob coupled to the main housing, wherein the tension knob is configured to couple to a puller rod;
   a tension spring within the main housing, wherein the loading cap is configured to set the tension spring at an initial tension, and wherein the tension knob is configured to set the tension spring at a subsequent tension; and
   a heater configured to apply heat to the panel insert;
   wherein the tension knob couples to an upper end of the puller rod, the upper end being contained within the main housing.

2. The system of claim 1, wherein the tension knob comprises:
   an engagement head; and
   a stem extending from the engagement head, wherein the stem extends into a central channel formed through the loading cap.

3. The system of claim 1, wherein the main housing comprises a neck, and wherein the loading cap rotationally couples to the neck.

4. The system of claim 3, wherein the neck comprises one or more guide channels, wherein the loading cap comprises one or more bearings, and wherein the one or more guide channels retain the one or more bearings.

5. The system of claim 4, wherein the one or more guide channels comprise:
   an upper segment;
   an arcuate segment connected to the upper segment, wherein the arcuate segment downwardly curves around a portion of the neck; and
   a notch connected to the arcuate segment.

6. The system of claim 3, wherein the neck comprises a circumferential flange configured to prevent the loading cap from disconnecting from the neck.

7. The system of claim 1, wherein the tension spring is fully contained within the main housing.

8. The system of claim 1, wherein the heater is contained within the main housing.

9. The system of claim 8, wherein the heater is moveable within the main housing.

10. The system of claim 1, wherein a portion of a shaft of the puller rod passes through the heater.

11. The system of claim 10, wherein the heater comprises one or more heat isolating components between the heater and the portion of the shaft of the puller rod.

12. The system of claim 1, wherein the loading cap comprises one or more tool-engagement channels configured to receive one or more portions of a hand tool.

13. The system of claim 1, further comprising one or more tension keys configured to be disposed between the tension knob and the loading cap to set the tension spring at the subsequent tension.

14. The system of claim 13, wherein the one or more tension keys are removably retained with one or more key channels of the main housing.

15. The system of claim 13, wherein the one or more tension keys comprise a plurality of tension keys, wherein each of the plurality of tension keys has a different height.

16. A method for removing a panel insert from a panel, the method comprising:
   setting, by a loading cap coupled to a main housing, an initial tension of a tension spring disposed within the main housing;
   setting, by a tension knob coupled to the main housing and an upper end of a puller rod within the main housing, a subsequent tension of the tension spring; and
   applying, by a heater, heat to the panel insert;
   wherein the setting the initial tension comprises rotating the loading cap relative to a neck of the main housing.

17. The method of claim 16, further comprising disposing one or more tension keys between the tension knob and the loading cap to set the tension spring at the subsequent tension.

18. A system for removing a panel insert from a panel, the system comprising:
   a main housing including a neck including one or more guide channels, wherein the one or more guide channels include (a) an upper segment, (b) an arcuate segment connected to the upper segment, wherein the arcuate segment downwardly curves around a portion of the neck, and (c) a notch connected to the arcuate segment;
   a loading cap rotationally coupled to the neck of the main housing, wherein the loading cap includes one or more bearings, and wherein the one or more guide channels retain the one or more bearings;
   a tension knob coupled to the main housing, wherein the tension knob is coupled to an upper end of a puller rod within the main housing, wherein the tension knob includes an engagement head, and a stem extending from the engagement head, wherein the stem extends into a central channel formed through the loading cap;
   a tension spring contained within the main housing, wherein the loading cap is configured to set the tension spring at an initial tension, and wherein the tension knob is configured to set the tension spring at a subsequent tension; and
   a heater contained within the main housing, wherein the heater is configured to apply heat to the panel insert, wherein a portion of a shaft of the puller rod passes through the heater, and wherein the heater comprises one or more heat isolating components between the heater and the portion of the shaft of the puller rod.

19. A system for removing a panel insert from a panel, the system comprising:
   a main housing;
   a loading cap coupled to the main housing;
   a tension knob coupled to the main housing, wherein the tension knob is configured to couple to a puller rod;
   a tension spring within the main housing, wherein the loading cap is configured to set the tension spring at an initial tension, and wherein the tension knob is configured to set the tension spring at a subsequent tension; and
   a heater configured to apply heat to the panel insert;

wherein the main housing comprises a neck, and wherein the loading cap rotationally couples to the neck;

wherein the neck comprises one or more guide channels, wherein the loading cap comprises one or more bearings, and wherein the one or more guide channels retain the one or more bearings.

20. A system for removing a panel insert from a panel, the system comprising:
   a main housing;
   a loading cap coupled to the main housing;
   a tension knob coupled to the main housing, wherein the tension knob is configured to couple to a puller rod;
   a tension spring within the main housing, wherein the loading cap is configured to set the tension spring at an initial tension, and wherein the tension knob is configured to set the tension spring at a subsequent tension;
   a heater configured to apply heat to the panel insert; and
   one or more tension keys configured to be disposed between the tension knob and the loading cap to set the tension spring at the subsequent tension;
   wherein the one or more tension keys are removably retained with one or more key channels of the main housing.

21. A system for removing a panel insert from a panel, the system comprising:
   a main housing;
   a loading cap coupled to the main housing;
   a tension knob coupled to the main housing, wherein the tension knob is configured to couple to a puller rod;
   a tension spring within the main housing, wherein the loading cap is configured to set the tension spring at an initial tension, and wherein the tension knob is configured to set the tension spring at a subsequent tension;
   a heater configured to apply heat to the panel insert; and
   a plurality of tension keys configured to be disposed between the tension knob and the loading cap to set the tension spring at the subsequent tension, wherein each of the plurality of tension keys has a different height.

* * * * *